July 18, 1967  W. E. GRAY, JR  3,331,509
STRAINER
Filed June 15, 1964  2 Sheets-Sheet 2

INVENTOR.
William E. Gray, Jr.
BY
Harness, Dickey & Pierce
ATTORNEYS.

United States Patent Office 3,331,509
Patented July 18, 1967

3,331,509
STRAINER
William E. Gray, Jr., Huntington Woods, Mich., assignor to Michigan-Dynamics, Inc., Detroit, Mich., a corporation of Michigan
Filed June 15, 1964, Ser. No. 374,979
4 Claims. (Cl. 210—90)

ABSTRACT OF THE DISCLOSURE

A unitary filter cartridge having two hollow cylindrical filter elements in fixed spaced concentric relationship. Two pressure responsive valves at opposite ends of the inner filter element. In operation, fluid first flows thru the outer element, the space between the elements and the outlet; and when the outer element is plugged one valve opens flow to the interior of the inner element, thru the inner element, the space between the elements and to the outlet; and when the inner element is plugged, the second valve opens and allows flow from the interior of the inner element to the outlet.

---

This invention relates generally to strainers and particularly to a filtering device having means for indicating when a preselected percentage of the filtration capacity of the device has been consumed.

A static filter or strainer incorporates one or more porous elements through which the fluid to be filtered is passed. The fluid itself will pass through the pores or openings, but solid matter carried by the fluid, which is of a larger size than the pores or openings, is trapped and prevented from being carried on by the fluid. While some of the entrapped particles may be washed off of the surface of the porous element and fall into a sediment repository, they frequently adhere to the porous element. The buildup of contaminant particles on the porous element, which occurs with continued use, gradually clogs more and more of the pores of the filtering element. As a result of the increasing complexity of aircraft engines and other fluid handling devices there has arisen a need to remove more and finer particles of contaminant from fluid. This necessitates the provision of finer pores or openings in the filtering media, which are more readily clogged. While various devices have been proposed to extend the filtering life or capacity of the filtering element or media used, in all strainers, the filtering media must be periodically removed for cleaning or be replaced. Otherwise the clogged pores will unduly impede the flow of fluid through the strainer and "starve" the engine or other device to which the fluid is being delivered.

One problem which has plagued filter designers in the aircraft industry is that of providing an effective indicating device which will inform both the pilot and the ground technician that the fuel filter is in need of being cleaned or replaced. In the past, filtering devices have utilized various means actuated by the pressure differential between the filter inlet and outlet to inform the pilot and ground technician that the filter was in need of cleaning or replacing. This is possible because of the fact that when the screen or strainer through which the fuel passes becomes sufficiently contaminated with foreign matter and it offers a resistance to the flow of a fluid under pressure which markedly reduces the pressure of the fluid downstream of the filter compared to the pressure of the fluid upstream of the filter.

One of the drawbacks of such a device is that approximately 93% of the filtration life of the filter must have been used before a pressure differential across a filtering element is realized which is sufficient to accurately control an indicating device. Thus, nearly all of the life of the filter will have been expended before the indicator is actuated. Should the aircraft be in flight when this occurs, there is danger that all of the filter life will be used up before repair can be made. In such a case, a relief valve provided on the filter will open thereby permitting free, unfiltered flow of fuel to the engine.

In an effort to overcome this problem, designers have calibrated the expected life of various filters in hours of filtering operation thereby providing guidelines for the aircraft technician. However, this does not take into consideration conditions such as icing where the aircraft is flying at an altitude sufficient to cause water in the fuel to freeze. Under these conditions, ice will build up rapidly at the filtering element and will severely shorten the filter life by restricting or even blocking the fuel flow therepast. Again, should the filter be completely blocked during a flight, the filter relief valve will open thereby permitting unfiltered fuel to pass to the engine. This is undesirable since dirt, ice, and other contaminant in the fuel can harm the engine.

The device of the present invention is designed to overcome the foregoing problems by providing a filter which will give an indicating warning substantially prior to the consumption of 93% of the filter's capacity. This device includes a double filtration screen assembly, only one screen of which is initially used to filter the fuel. A novel pressure differential sensing device is operatively associated with the fuel pressure input to the first filter assembly and the pressure output. Thus, at a predetermined time, for example when the filtration life of the first filter assembly is about 93% expended, the pressure differential sensing device will be actuated thereby informing the aircraft pilot and technician of this condition. However, the effective blocking of the first filter assembly and pressure buildup at the filter inlet will act to open a pressure responsive valve whereupon the fuel will be free to pass through and be filtered by both screens. Thus, a substantial portion of the filter life will remain after the indicating device has been actuated thereby allowing adequate time for replacing or cleaning the filter assembly.

A principal object therefore of the present invention is to provide a fuel filtering assembly having improved means for indicating when a predetermined portion of the filter life has been expended so that the filter may be cleaned or replaced well before becoming excessively clogged.

It is a further object of the present invention to provide a fuel filtering device of the above character having a primary filter element, a reserve filter element rendered operable when the primary filter element is effectively clogged, and means for indicating when the reserve filter has been rendered active.

It is a further object of the present invention to provide a fuel filtering device of the above character which possesses a large capacity for the area it occupies.

It is still a further object of the present invention to provide a fuel filtering device of the above character which is relatively inexpensive to manufacture, sturdy in construction, convenient to service, and reliable in operation.

Other objects and advantages of the present invention will become more apparent from the following detailed description taken in conjunction with the drawings in which:

FIG. 5 is an enlarged sectional view of a portion of the device of FIG. 1 taken along the line 5—5 thereof.

Figure 1:
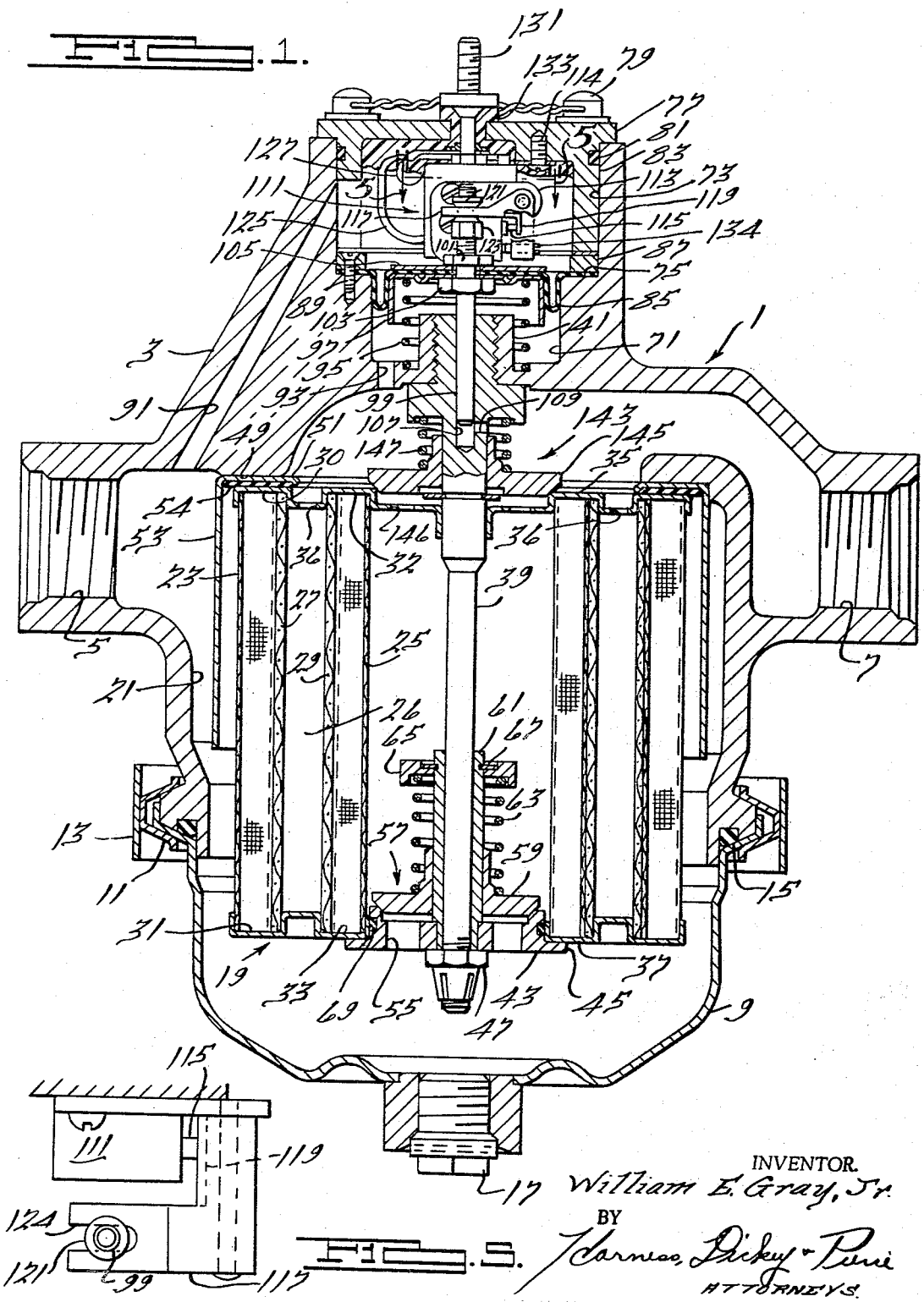
FIGURE 1 is a vertical sectional view of a device constructed in accordance with the present invention.

Referring now to the drawings and especially to FIGURE 1, a fuel filtering device constructed according to the present invention is indicated generally at 1 and includes an upper housing 3 provided with an inlet opening 5 and an outlet opening 7 adapted to be connected by fuel lines to a conventional supply tank and gasoline engine, respectively. A lower housing member 9 is attached to the upper housing 3 by a split annular member 11 retained in position by a removable sleeve 13. A conventional O-ring 15 may be interposed between the mating faces of the upper and lower housing members 3 and 9, respectively, to provide a fluid seal therebetween while a drain plug 17 is provided in the lower housing 9 to remove accumulated sediment therefrom.

An annular fuel filter cartridge 19 is shown as positioned within a main fuel chamber 21 formed by the upper and lower housings 3 and 9, respectively. The filter cartridge 19 includes an outer and inner layer of fine woven wire screens 23 and 25, which form a primary and reserve element, respectively, for filtering fuel as it passes therethrough. The screen 23 and 25 are made of corrugated or sinuous cross sectional shape for the purpose of maximizing the surface area thereof. Further, it will be seen that the inner screen 25 is spaced concentrically within outer screen 23, forming an annular chamber or passage 26 therebetween. Disposed on the sides of the fine woven wire screens 23 and 25 adjacent the passage 26 are a pair of coarsely woven reinforcing sleeves 27 and 29. The screens 23 and 27 are secured at their opposite ends in annular grooves 30 and 31 formed in a pair of annular end caps 35 and 37, respectively. Similarly, the screens 25 and 29 are seated at their opposite ends in annular grooves 32 and 33 formed in the caps 35 and 37, respectively, within the grooves 30 and 31. A plurality of openings 36 formed in the cap 35 between the grooves 30 and 32 permit flow of the filtered fluid from the space between the sleeves 27 and 29 to the filter outlet 7. On the other hand, the cap 37 closes the passage 26 at the opposite end of the cartridge 19.

Removably mounting and accurately centering the cartridge 19 within the main fuel chamber 21 is a bolt or stem member 39 having one end thereof threadedly received within a threaded portion 41 of the upper housing 3. The stem member 39 extends through the center of the cartridge 19 and also through a retaining member 43 positioned adjacent the bottom of the cartridge 19. As shown in FIGURE 1, the retaining member 43 is received within the annular cap 37 and is provided with an outwardly extending flange portion 45 positioned to engage and support the cap 37 and, therefore, the cartridge 19. A nut 47 engages the lower portion of the retaining member 43 and is threadedly received on the stem member 39. The upper portion of the cartridge is shown as positioned adjacent a downwardly facing annular surface 49 with an anular portion 51 of a baffle member 53 interposed between the anular cap 35 and the annular surface 49. A resilient annular seal 54 may be positioned between the portion 51 and the cap 35 to prevent the flow of fluid therepast.

The retaining member 43 is shown as having a plurality of openings 55 therein; however, fluid is normally prevented from passing therethrough by a valve indicated generally at 57. Thus, the valve 57 is seen to include a piston 59 adapted to engage the upper portion of the retaining member and prevent the flow of fluid past the openings 55. The piston 59 conveniently is slidably mounted on a sleeve 61, closely fitted over the stem member 39, and is biased toward its closed position by one end of a helical compression spring 63. A spring backing member 65 may be retained on the sleeve 61 by a snap ring 67 and is positioned to abut the other end of the spring 63. A conventional seal 69 is positioned between the retainer 43 and the lower annular cap 37 to prevent the flow of fluid therepast. Thus, the valve 57 is normally maintained in a closed position to prevent the flow of incoming, unfiltered fluid to the space enclosed by the screen 25. Accordingly, incoming fuel will flow from the inlet opening 5 around the baffle member 53 through the outer primary filter element or screen 23 and then through the openings 36 to the filter outlet 7. A conventional means such as an ordinary fuel pump positioned between the filter outlet 7 and the engine is used to draw the fuel through the filter 1.

As the primary screen 23 filters the fuel passing therethrough, it will progressively accumulate contaminant particles and will gradually offer increased resistance to fluid flow. As this happens, the fluid pressure at the filter outlet 7 will decrease relative to the fluid pressure at the filter inlet 5. This pressure differential will be exerted on the upper and lower surfaces, respectively, of the piston 59 of the valve 57. This is so because the fluid inlet pressure is applied through the openings 55 in the retainer 43 to the lower portion of the piston 59 while the fluid outlet pressure is exerted on the upper portion of the piston 59, along with the force of the spring 63, through the uncontaminated wire screen 25. The spring 63 and the upper and lower surface areas of the piston 59 are so designed that when the pressure differential between the fluid inlet and the fluid outlet reaches a predetermined level, the fluid inlet pressure will overbalance the fluid outlet pressure and the force of the spring 63 to open the valve 57. Thus, fluid will then flow to the space within the screen 25 and thence radially outwardly through the screen 25 to the passage 26. From this location, the filtered fuel will flow through the openings 36 to the filter outlet 7.

An indicating device is provided on the fuel filter and is designed to inform the aircraft pilot and the ground technicians that the primary filter element or fine wire screen 23 is contaminated, that the secondary filter element or screen 25 is being used and that the filter cartridge is in need of either being cleaned or replaced. Thus, the upper housing 3 is provided with a pressure cavity including a lower bore 71 and an upper bore 73 separated by a radial shoulder 75. The pressure cavity is closed, at its upper end, by a cap 77 fixed to the upper housing 3 by appropriate means such as screws 79. As shown, a conventional seal ring 81 may be disposed about the periphery of a cylindrical portion 83 of the cap 77 to form a seal between the portion 83 and the upper bore 73.

A flexible pressure responsive diaphragm 85 has its periphery sealingly secured between the shoulder 75 and a ring 87 held in position by appropriate means such as bolts 89. In use, the upper surface of the diaphragm 85 will be subjected to the filter inlet pressure through housing opening 91 while the lower surface thereof will be subjected to the filter outlet pressure through an opening 93. Also exerting pressure on the underside of the diaphragm 85 is a compression spring 95 having one end thereof in engagement with a pressure plate 97 fixed to a central portion of the diaphragm while the other end of the spring abuts a lower surface of the bore 71.

A switch actuating rod 99 is shown as extending through the center of the diaphragm 85 and fixed thereto for movement with the diaphragm by a pair of nuts 101 and 103, disposed on opposite sides of the diaphragm. To add rigidity, a plate 105 may be interposed between the nut 101 and the diaphragm 85. The lower portion of the switch actuating rod 99 is slidably guided within a bore 107 formed in the upper portion of the bolt 39. An opening 109 communicates the bore 107 with the outlet opening 7 to permit egress of any trapped fuel from the bore 107 during downward movement of the rod 99. Thus, the spring 95 is so designed that under normal operating conditions, as when the fuel is permitted relatively free flow from the filter inlet 5 through the primary filter layer 23 and to the filter outlet 7, the force exerted by inlet pressure acting against the top surface of the diaphragm 85 is overcome by the combined force of outlet pressure acting against the lower surface of the diaphragm and the spring 95. However, when the inlet pressure exceeds the outlet pressure by a predetermined amount, as for example an amount slightly less than that necessary to cause opening of the valve 57, the diaphragm 85 and the switch actuating rod 99 are moved downwardly a distance sufficient to actuate a switch while the switch 111 could be designed to actuate simultaneously with the valve 57, the spring 95 is designed to cause actuation of the switch 111 just before actuating the valve 57 as a precautionary matter to allow for possible delays in the operation of the switch 111. By designing the indicating device to be responsive to both inlet and outlet pressure and thereby reducing mechanical controls thereof to a minimum, the possibility of failure of the indicator to operate is effectively eliminated.

The switch 111 is seen to include a housing 113 fixed to the cap 77 by a screw 114 upon which is mounted a switch button 115 and a pivotal bell crank lever 117 having a switch engaging portion 119. The switch actuating rod 99 has threadedly mounted on the top portion thereof a second pair of spaced nuts 121 and 123 which slidably engage a slotted portion 124 of the bell crank lever 117 for pivotal movement of the same upon vertical movement of the rod 99. A pair of conductors 125 and 127 connect the switch button 115 in series with a source of electrical current 129, shown in FIGURE 4, through a pair of terminals 131 (only one of which is shown) extending through the cap 77. As shown in FIGURE 1, a suitable resinous substance 133 provides a seal between the terminals 131 and the cap 77. The switch 115 is preferably of the type that is spring biased to its closed position, but, its contacts are held open by the switch engaging portion 119 of the bell crank lever 117 under the normal operating conditions of the filter. However, when the diaphragm 85 and actuating rod 99 are moved downwardly by an increase in the filter inlet pressure as described hereinabove, the bell crank lever 117 will be pivoted counterclockwise as viewed in FIGURE 1 moving the switch engaging portion 119 away from the switch 115 and allowing it to close. This closes an electrical circuit to give a visible warning, as will now be described.

The position in which the crank lever 117 is normally held is determined by an adjusting screw 134 engageable with the switch 111 beneath the button 115 thereof. This prevents overtravel of the switch and permits the unit to be adjusted so that the switch 111 will always trip at the same point during the movement of the rod 99. Furthermore, it will be seen that the lever 117 affords a mechanical advantage in operating the switch. This minimizes the influence of variations in the force required to actuate the switch.

Figure 4:
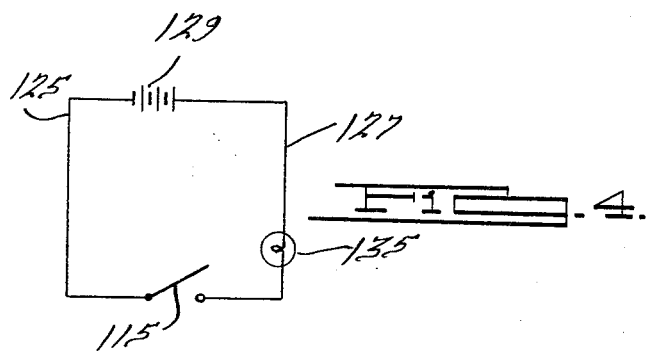
FIG. 4 is a diagrammatic view of an electrical circuit showing how the device of FIG. 1 is operable to produce to visual signal.

As shown in FIGURE 4, the switch 111 and the source of electrical current 129 are connected in series with a visible alarm device such as a light 135. Accordingly, the closing of the switch 115 by counterclockwise pivotal movement of the bell crank lever 117 will cause the light 135 to be lighted. In the case of aircraft fuel filters this occurrence is noted by the pilot, who records the same in his log. Based on this information, the filter will be serviced. It should also be noted that if the condition which causes the switch to actuate is abated the light B5 is automatically turned off. For example, ice in fuel filters can melt, or high viscosity oils in industrial uses can warm up, lowering their viscosity and enabling them to pass through the filter more readily.

As was set forth hereinabove, the device of the present invention utilizes a fuel filter having a primary and secondary filter element, with the indicating device being actuated when the primary filter element has been substantially completely contaminated. Thus, the filter elements can be designed to indicate nearly any predetermined percentage of filter life remaining merely by appropriately designing the primary and secondary filter element sizes. In one highly acceptable filter design, the primary filter constitutes 60% of the total filter while the secondary filter makes up the remaining 40%. Thus, when the indicator has been activated and the valve 57 has been opened, upon excessive clogging of the primary filter, it is known that approximately 60% of the filter life has been expended and that 40% remains.

A relief valve is indicated generally at 143 and is seen to include a valve piston 145 conveniently mounted for slidable movement on the stem 39 and adapted to seat against the upper filter cap 35 and thereby prevent fuel flow through a plurality of openings 146. One end of a compression spring 147 is seen to abut the valve piston 145 while the other end thereof is in engagement with a flange portion of the stem 39. The spring 147 is designed so that the piston is normally seated against the upper filter cap 35 and will prevent fuel from flowing from within the filter cartridge 19 through the openings 146 to the filter outlet 7. However, should the primary and secondary filter elements both become contaminated, as for example if the pilot and technicians fail to heed the indicated contaminated condition, the inlet pressure within the secondary filter element will increase to an extent sufficient to open the relief valve and permit fuel to flow therepast.

Figure 2:
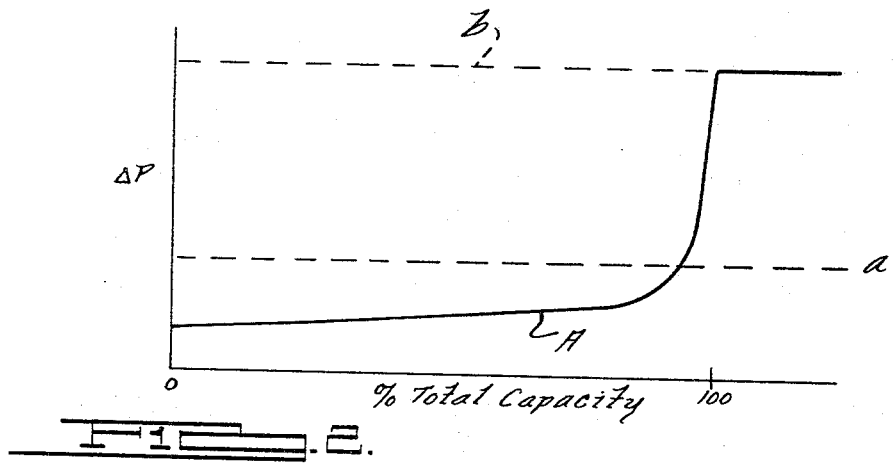
FIGURE 2 is a graph showing the pressure differential between the filter inlet and outlet of prior filtering devices as a function of the percentage of filtering capacity which has been consumed.
Figure 3:
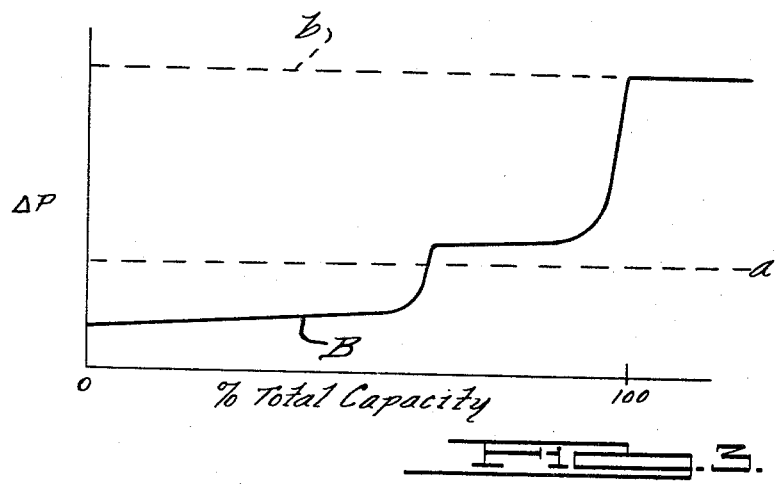
FIG. 3 is a graph showing the pressure differential between the filter inlet and outlet as a function of percentage of the consumed filtering capacity in the device of the present invention.

FIGURES 2 and 3 are a graphic representation of the pressure differential between the filter inlet and filter outlet as a function of percentage of total filter capacity used, FIGURE 2 being for a conventional single element filter heretofore used and FIGURE 3 being for the two element filter of the present invention. The curve A in FIGURE 2 indicates that nearly all of the filter capacity need be used up before any marked increase in the pressure differential between the filter inlet and outlet occurs. In practice, it was discovered that the minimum pressure differential (indicated by the line $a$) needed to enable the switch to give accurate indication of the actual life left in a fuel filter of this type occurred when the filter life was about 93% expended. This is true even though this pressure is substantially less than the maximum permissible differential pressure, indicated by the line $b$. Thus, indicators of this type have suffered in the past from the very short time which remained before the relief valve would open and allow the passage of unfiltered fuel. However, as shown by curve B of FIGURE 3, the filter life is only approximately 60% expended when a marked increase in the pressure differential occurs, in the device of the present invention and the curve B intersects line $a$. This is so because of the existence of two filter elements in the device of the present invention. Since approximately 40% of the filter life remains after energization of the indicator, a sufficient time remains in which to replace or clean the filter before the pressure differential reaches line $b$ and causes the relief valve 145 to open. Therefore, passage of unfiltered fuel to the engine is virtually eliminated.

While a preferred embodiment of the present invention has been illustrated and described herein, it is to be understood that various additions, modifications, substitutions and omissions can be made thereto without departing from the spirit of the invention as encompassed by the appended claims.

What is claimed is:

1. A filter device including a housing having inlet and outlet openings, a filter cartridge mounted in said housing to filter fluid as it passes from said inlet to said outlet openings, said filter cartridge having a generally outer hollow cylindrical filter element and an inner generally hollow cylindrical filter element spaced concentrically within said outer filter element and at least one end member joining said filter elements to prevent relative movement therebetween, the outer periphery of said outer filter element being exposed to said inlet opening and the space between said filter elements being in open communication with said outlet opening, means at the opposite ends of said inner filter element defining first and second valve seats fixed and sealed with respect to said inner filter element, first and second valve elements engageable with said first and second valve seats, respectively, said first valve element being movable away from said first valve seat in response to a first predetermined differential pressure between said inlet opening and the interior of said inner filter element to permit fluid to flow from said inlet opening to the interior of said inner filter element through said first valve seat and said second valve element being movable away from said second valve seat in response to a second predetermined differential pressure greater than said first predetermined differential pressure to permit fluid to flow from the interior of said inner filter element to said outlet opening through said second valve seat.

2. The structure set forth in claim 1 including indicating means and means responsive to pressure differential between said inlet and outlet openings operable to actuate said indicating means at substantially the time said first differential pressure occurs.

3. The structure set forth in claim 1 including a stem secured to said housing and passing centrally through said inner filter element, fastener means on said stem operable to hold said filter cartridge in fixed position in said housing, said valves being slidably disposed on said stem.

4. The structure set forth in claim 1 including a second end member disposed at the end of said filter cartridge opposite from said at least one end member and cooperating with said at least one end member in holding said inner and outer filter elements in relatively fixed relationship.

References Cited

UNITED STATES PATENTS

| | | | |
|---|---|---|---|
| 2,617,535 | 11/1952 | Hamilton | 210—132 |
| 2,998,138 | 8/1961 | Mould et al. | 210—132 X |
| 3,007,579 | 11/1961 | Pall | 210—493 X |
| 3,077,176 | 2/1963 | Pall et al. | 210—90 X |
| 3,187,895 | 6/1965 | Pall et al. | 210—493 X |
| 3,216,571 | 11/1965 | Whiting et al. | 210—132 X |
| 3,268,077 | 8/1966 | Ball | 210—132 X |

SAMIH N. ZAHARNA, *Primary Examiner.*